United States Patent Office 3,801,570
Patented Apr. 2, 1974

3,801,570
3-AMINO-4,5-DEHYDRO-CARDENOLIDES AND PROCESS FOR THEIR MANUFACTURE
Ulrich Stache, Hofheim, Taunus, Werner Fritsch, Neuenhain, Taunus, Werner Haede, Hofheim, Taunus, Kurt Radscheit, Kelkheim, Taunus, and Ernst Lindner, Frankfurt am Main, Germany, assignors to Farbwerke Hoechst Aktiengesellschaft vormals Meister Lucius & Bruning, Frankfurt am Main, Germany
No Drawing. Filed Oct. 27, 1971, Ser. No. 193,163
Claims priority, application Germany, Oct. 29, 1970, P 20 53 117.3
Int. Cl. C07c 173/02
U.S. Cl. 260—239.57   9 Claims

ABSTRACT OF THE DISCLOSURE 3-amino - 4,5 - dehydro-cardenolides of the general formula

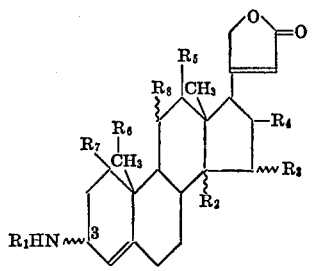

in which $R_1$ represents hydrogen or a lower aliphatic acyl radical, $R_2$ and $R_3$ each represent hydrogen or hydroxy, or $R_2$ and $R_3$ together represent a further C—C bond or an α- or β-oxido group, $R_4$, $R_5$, $R_6$ and $R_7$ each represent hydrogen or a hydroxy group which may be esterified— the OH group for $R_6$ may also be etherified—$R_8$ represents hydrogen or hydroxy, and the salts thereof with inorganic or organic acids, if $R_1$ represents hydrogen. The compounds have valuable pharmalogical properties, especially a positive or negative inotropic action and a substantially improved lipid solubility. Methods for making and using the compounds.

---

The present invention relates to 3-amino-4,5-dehydro-cardenolides of the general formula

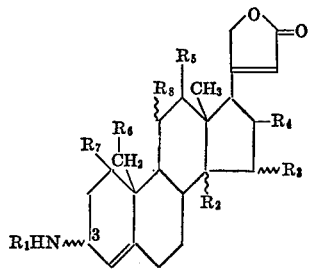

in which $R_1$ represents hydrogen or a lower aliphatic acyl radical, $R_2$ and $R_3$ each represent hydrogen or hydroxy, or $R_2$ and $R_3$ together represent a further C—C bond or an α- or β-oxido group, $R_4$, $R_5$, $R_6$ and $R_7$ each represent hydrogen or a hydroxy group which may be esterified—the OH group for $R_6$ may also be etherified—and $R_8$ represents hydrogen or hydroxy, and to the salts thereof with inorganic or organic acids, if $R_1$ represents hydrogen.

This invention relates furthermore to a process for the manufacture of these compounds, which comprises reacting 3-oxo - 4,5 - dehydro-cardenolides of the above formula, wherein there is an oxo function instead of the 3-amino group and $R_2$ to $R_8$ have the meanings given above, with hydroxylamine or the salts thereof, then reducing the cardenolido-3-oxime derivatives obtained to the 3-amino-4,5-dehydro-cardenolides by means of zinc in the presence of lower aliphatic carboxylic acids and optionally acylating these 3-amino compounds with lower aliphatic carboxylic acids or the derivatives thereof or converting them into the acid addition salts thereof with organic or inorganic acids.

The fact that the oxime group in 3-position is reduced in preference to the 17β-butenolide ring is very surprising. Moreover, it could not be foreseen that, in general, neither isolated double bonds nor oxido groups present are reduced. Hydroxy groups in free or etherified form in the 1-, 5-, 11-, 12-, 14-, 15-, 16- and 19-positions are also not altered during the reduction.

As starting compounds there are, for example, mentioned the following 3-oxo-4,5-dihydro-cardenolides which can be obtained either by partial synthesis or by oxidation of the corresponding 3 - hydroxy - 4,5 - dehydro-cardenolides according to known methods: Canarigenone, 19-hydroxy-canarigenone, 19-methoxy-canarigenone, 19-oxo-canarigenone, 3-oxo-14α- or 14β-carda-4,10(22)-dienolide, 14, 15β-oxido-carda-4,20(22)-dienolide, 3-oxo-carda-4,14,20(22)-trienolide.

For the conversion of the 3-oxo-cardenolides into the 3-oximes thereof, hydroxylamine as such or in the form of the salts thereof which may be derived from hydrochloric acid, hydrobromic acid, sulfuric acid, acetic acid or oxalic acid, is used.

For the reduction of the 3-oxime group to the amino group, zinc is used in the presence of aliphatic carboxylic acids, preferably zinc/glacial acetic acid in the presence of an organic solvent such as alcohol, or glacial acetic acid/acetic anhydride. In addition to glacial acetic acid, formic acid or propionic acid may also be used.

The 3-oxo-cardenolides are converted into the 3-oximes according to generally used methods. For example, the 3-oxo-4,5-dehydro-cardenolide is dissolved or suspended in an alcohol, for example methanol, excess hydroxylamine in the form of a salt thereof, for example as the hydrochloride, as well as water and a weak base, for example sodium acetate, are added for neutralization of the acid, and the reaction mixture is refluxed for 1 to 5 hours. After the usual work-up the cardenolido-3-oximes obtained are isolated as crystals.

For the conversion of the cardenolido-3-oximes into the corresponding 3-amino-4(5)-dehydro-cardenolides, the 4(5)-dehydro-cardenolido-3-oxime is advantageously dissolved in a mixture of ethanol and glacial acetic acid and excess zinc is then added portionwise. For completing the reaction, the reaction mixture is stirred for 1 to 24 hours at 0° C. to 30° C. or it is heated for half an hour to 6 hours at a temperature of from 30° C. to the boiling point of the solvent used. The products are then worked up as usual by converting the crude 3-acylamino-4(5)-dehydro-cardenolides obtained into the free 3-amino derivatives with the addition of aqueous ammonia. When the other reducing agents mentioned above are used, the procedure is the same.

In their free form the crude 3-amino-4(5)-dehydro-cardenolides obtained are generally isolated in the pure state by recrystallization from suitable inert organic solvents. The crude products may, however, also be purified by converting them in a reaction with inorganic or organic acids, for example hydrochloric acid, hydrobromic acid or hydroiodic acid, sulfuric acid, oxalic acid, acetic acid, formic acid, propionic acid, phthalic acid, picric acid or ascorbic acid, in inert solvents, for example ether, tetrahydrofuran, dioxan, ethanol or methanol, into their 3-amino-cardenolide salts, purifying these either by recrystallization from inert solvents or by means of other generally known purification operations, and then converting the purified 3-amino-4(5)-dehydro-cardenolide salts thus obtained in a reaction with weak inorganic bases, for example solid bicarbonate or sodium carbonate, into the free 3-amino-cardenolides which are then recrystallized, where required.

The free 3-amino-4(5)-dehydro-cardenolides may, however, also be converted into their 3-acyl-amino-4(5)-dehydro-cardenolides in usual manner by means of acylhalides or acylanhydrides in the presence of tertiary bases, for example pyridine, optionally with the addition of inert solvents. As acyl radicals there are preferably mentioned radicals of lower aliphatic carboxylic acids having 1 to 3 carbon atoms. The acyl derivatives obtained may be used as such for therapeutic purposes.

Acylation may also be performed merely for purification of the products of the invention obtained. The acylated compounds may then, for example, be recrystallized, hydrolyzed with basic substances and reconverted into the free 3-amino derivatives.

In the form of their free amine bases, salts or N-acyl derivatives, the products of the invention have valuable pharmacological properties. They exhibit cardiotonic actions (for example a positive or negative inotropic action). The relationship of the cardiotonic actions to each other is surprisingly different from that of the corresponding 3-hydroxy compounds from which they are derived. It is furthermore surprising that highly cardiotonically active components are contained even in those products and intermediates of the invention which do not carry an oxygen function in 14-position (for example, structures having 14-H or 14(15)-double bonds), although it is known that the analogues thereof carrying an oxygen function in 3-position, but not in 14-position, do not show corresponding actions. Moreover, some of the above-mentioned products of the invention and the intermediates thereof exhibit interesting cardiovascular and/or adrenergic properties.

Animal tests may be carried out using the atrium test or the K-excretion test on the isolated heart of guinea pigs. Thus, in animal tests, the 3-amino-4,5-dehydro-cardenolides show a positively inotropic activity comparable to the cardiac glycosides used, but they often have a higher oral resorption rate than those glycosides. Further, pharmacologically important parameters such as duration of action, adhesion on the receptors of the heart muscle cell, and cumulation are positively influenced by the introduction of a 3-amino-group into the steroids. Also, the products of the process of the invention excel by their substantially better lipid-solubility, as compared to the starting substances.

The new compounds are valuable therapeutic agents for cardiac insufficiency. The single dose for a human being may be from about 0.1 to 1 mg. per unit. The new compounds may be therapeutically administered above all orally as dragées, tablets or capsules, for which the usual pharmaceutical carriers, for example, starch, lactose, tragacanth, magnesium stearate and talc, may be used. For intravenous injections, water or physiological sodium chloride solution may serve as solvents for the ampoules.

The following examples serve to illustrate the invention.

EXAMPLE 1

(a) 2.1 g. of hydroxylamine hydrochloride were added to a solution of 2 g. of 3-oxo-14α-card-4,20(22)-dienolide in 200 ml. of methanol and after addition of 5 g. of sodium acetate in 21 ml. of water the whole was refluxed for 2 hours. The solution was then concentrated in vacuo, the reaction mixture was poured into water, and the precipitated crystals were suction-filtered, washed and dried (over $P_2O_5$). 2.07 g. of the 3-oxime of 3-oxo-14α-card-4,20(22)-dienolide were obtained, M.P. above 260° C. Typical infrared bands (KBr): 3450–3350 (broad), 1780, 1750–1740, 1620 cm.$^{-1}$.

(b) 176 g. of zinc powder were introduced portionwise while stirring within 10 minutes into a solution of 7.6 g. of the 3-oxime of 3-oxo-14α-card-14,20(22)-dienolide in 448 ml. of ethanol and 960 ml. of glacial acetic acid. Subsequently, the reaction mixture was refluxed for 2 hours. After cooling, zinc was separated by filtration, the clear filtrate was concentrated in vacuo and the residue obtained was digested with ether. After standing for 24 hours the ether was decanted and the residue was once more digested with ether. After the ether had been decanted the residue was dissolved in water and the solution was rendered alkaline with aqueous ammonia solution with the addition of a small amount of sodium bicarbonate. The solution was then extracted to exhaustion with methylene chloride which was then distilled off in vacuo, and the residue obtained was digested with ether, whereupon a viscous crystal paste was obtained. The crystals were suction-filtered and recrystallized from methylene chloride/ether. 3-amino-14α-card-4,20(22)-dienolide was obtained, M.P. 220–221° C. (Kofler heating bench). Typical infrared bands (KBr): 3350, 3280, 3060, 1770 (in many cases, split up), 1730, 1620, 1585 cm.$^{-1}$.

(c) According to another method of work-up, the crude product, obtained according to (b) after digestion with ether, was dissolved in absolute tetrahydrofuran and the solution was acidified with ethereal hydrochloric acid until a pH of about 2 was reached, whereupon crystals precipitated. The solvents were then eliminated in vacuo, the residue was taken up in 270 ml. of water, the solution was heated for a short time on a steam bath, a small amount of still undissolved substance was separated by filtration and the clear filtrate was combined with aqueous sodium carbonate solution until a pH of about 8–10 was reached, whereupon a milky precipitate separated. The solution was then extracted once with ether and twice with acid-free methylene chloride. After the solvent had been eliminated from the methylene chloride extracts, a residue was obtained which was caused to crystallize from ether. After recrystallization from ethanol, the same reaction product having the same data as indicated sub (b) was obtained.

EXAMPLE 2

(a) A solution of 2 g. of 3-oxo-card-4,14,20(22)-trienolide in 200 ml. of methanol was reacted with 2.1 g. of hydroxylamine hydrochloride and the reaction product was worked up. 2.04 g. of the 3-oxime of 3-oxo-card-4,14,20(22)-trienolide were obtained, M.P. above 260° C. Typical infrared bands (KBr): 3450–3350 (broad), 1775, 1745, 1620 cm.$^{-1}$.

(b) A solution of 3.8 g. of the 3-oxime of 3-oxo-card-4,14,20(22)-trienolide in 224 ml. of ethanol and 480 ml. of glacial acetic acid was reacted with 88 g. of zinc powder in the manner described in Example 1(b) or (c) and the reaction product was worked up. After recrystallization from ethanol, 3-amino-card-4,14,20(22)-trienolide was obtained, M.P. 224–227° C. Typical infrared bands (KBr): 3340, 3270, 3060, 1770, 1730, 1620, 1580 cm.$^{-1}$.

EXAMPLE 3

(a) A solution of 2 g. of 3-oxo-14,15β-oxido-card-4,20(22)-dienolide in 200 ml. of methanol was reacted with 2.1 g. of hydroxylamine hydrochloride in the manner described in Example 1(a) and the reaction product was worked up. 2.02 g. of the 3-oxime of 3-oxo-14,15β-oxido-card-4,20(22)-dienolide were obtained. Typical infrared bands (KBr): 3450–3350 (broad), 1780, 1750, 1620 cm.$^{-1}$.

(b) A solution of 3.8 g. of the 3-oxime of 3-oxo-14,15β-oxido-card-4,20(22)-dienolide in 224 ml. of ethanol and 480 ml. of glacial acetic acid was reacted with 88 g. of zinc powder in the manner described in Example 1(b) or (c), and the reaction product was worked up. After recrystallization from ethanol, 3-amino-14,15β- oxido-card-4,20(22)-dienolide was obtained, M.P. 192-197° C. Typical infrared bands (KBr): 3345, 3280, 3060, 1770, 1730, 1620, 1585 cm.⁻¹.

EXAMPLE 4

(a) A solution of 2 g. of 3-oxo-14,15α-oxido-card-4,20 (22)-dienolide in 200 ml. of methanol was reacted with 2.1 g. of hydroxylamine hydrochloride in the manner described in Example 1(a) and the reaction product was worked up. 2.04 g. of the 3-oxime of 3-oxo-14,15α-oxido-card-4,20(22)-dienolide were obtained. Typical infrared bands (KBr): 3450-3350 (broad), 1775, 1745, 1620 cm.⁻¹.

(b) A solution of 3.8 g. of the 3-oxime of 3-oxo-14,15α-oxido-card-4,20(22)-dienolide in 224 ml. of ethanol and 480 ml. of glacial acetic acid was reacted with 88 g. of zinc powder in the manner indicated in Example 1(b) or (c), and the reaction product was worked up. After recrystallization from ethanol, 3-amino-14,15α-oxido-card-4,20(22)-dienolide was obtained, M.P. 220-222° C. Typical infrared bands (KBr): 3340, 3275, 3060, 1770, 1730, 1620, 1580 cm.⁻¹.

EXAMPLE 5

140 g. of the 3-amino-14α-card-4,20(22)-dienolide obtained according to Example 1(b) were dissolved in 4 ml. of pyridine and 0.5 ml. of acetic anhydride was added thereto. After standing for 18 hours at 23° C. the reaction mixture was poured onto 40 ml. of water containing sodium chloride, whereupon a precipitate separated. The precipitate was suction-filtered, washed with water, dried and digested with diethyl ether. After suction-filtration, 3-acetylamino-14α-card-4,20(22)-dienolide was obtained, M.P. 275-280° C. Typical infrared bands (KBr): 3300, 1780, 1745, 1655 (shoulder), 1625, 1530 cm.⁻¹.

What we claim is:

1. A 3-amino-4,5-dehydro-cardenolide of the formula

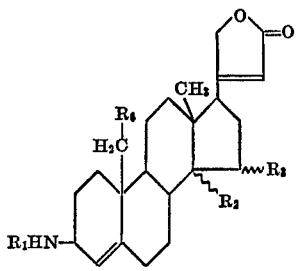

wherein $R_1$ is hydrogen or aliphatic acyl having 1 to 3 carbon atoms; $R_2$, taken alone, is hydrogen or hydroxy; $R_3$, taken alone, is hydrogen, or $R_2$ and $R_3$, taken together, form a carbon-carbon bond or are α-oxido or β-oxido; and $R_6$ is hydrogen, hydroxy, or methoxy; and, also, the salts with inorganic and organic acids of those cardenolides wherein $R_1$ is hydrogen.

2. 3-amino-14α-card-14,20(22)-dienolide.
3. 3-amino-card-4,14,20(22)-trienolide.
4. 3-amino-14,15β-oxido-card-4,20(22)-dienolide.
5. 3-amino-14,15α-oxido-card-4,20(22)-dienolide.
6. 3-acetylamino-14α-card-4,20(22)-dienolide.
7. The method of making a 3-amino-4,5-dehydro-cardenolide of the formula

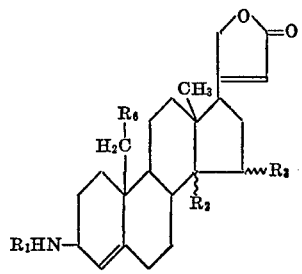

wherein $R_1$ is hydrogen; $R_2$, taken alone, is hydrogen or hydroxy; $R_3$, taken alone, is hydrogen, or $R_2$ and $R_3$, taken together, form a carbon-carbon bond or are α-oxido or β-oxido; and $R_6$ is hydrogen, hydroxy, or methoxy, which method comprises reacting a 3-oxo-4,5-dehydro-cardenolide of the formula

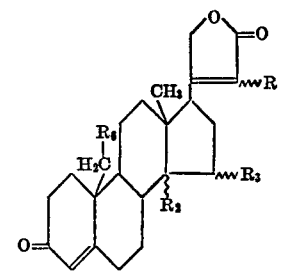

wherein $R_2$, $R_3$, and $R_6$ have their earlier meaning, with hydroxylamine or a salt thereof; reducing the 3-oxime-cardenolide so obtained with zinc in the presence of a lower aliphatic carboxylic acid; and recovering the 3-amino-4,5-dehydro-cardenolide.

8. A method as in claim 7 wherein the 3-amino group of said 3-amino-4,5-dehydro-cardenolide is subsequently acylated by reaction with an aliphatic carboxylic acid having 1 to 3 carbon atoms.

9. A method as in claim 7 wherein the 3-amino group of said 3-amino-4,5-dehydro-cardenolide is subsequently salified by reaction with an organic or inorganic acid.

References Cited

UNITED STATES PATENTS

| | | | |
|---|---|---|---|
| 3,197,471 | 7/1965 | Le Mer | 260—239.57 |
| 3,725,393 | 4/1973 | Stache et al. | 260—239.57 |
| 3,738,984 | 6/1973 | Lehmann et al. | 260—239.57 |

ELBERT L. ROBERTS, Primary Examiner

U.S. Cl. X.R.

424—241